(12) United States Patent
Golisano et al.

(10) Patent No.: US 11,225,134 B2
(45) Date of Patent: Jan. 18, 2022

(54) WINDSHIELD PLENUM ASSEMBLY WITH INTEGRATED VENTILATION PORT

(71) Applicant: GM GLOBAL TECHNOLOGY OPERATIONS LLC, Detroit, MI (US)

(72) Inventors: Roberto Golisano, Turin (IT); Antonio Giulio Marino, Turin (IT); Rosalino Massimiliano Alletto, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 156 days.

(21) Appl. No.: 16/812,905

(22) Filed: Mar. 9, 2020

(65) Prior Publication Data

US 2021/0276411 A1 Sep. 9, 2021

(51) Int. Cl.
*B60K 11/08* (2006.01)
*B60J 1/02* (2006.01)
*B60H 1/28* (2006.01)
*B60R 13/07* (2006.01)
*B62D 25/08* (2006.01)

(52) U.S. Cl.
CPC ............ *B60K 11/08* (2013.01); *B60H 1/28* (2013.01); *B60J 1/02* (2013.01); *B60R 13/07* (2013.01); *B62D 25/081* (2013.01)

(58) Field of Classification Search
CPC ... B60K 11/08; B60J 1/02; B60H 1/28; B60R 13/07; B62D 25/081
See application file for complete search history.

(56) References Cited

U.S. PATENT DOCUMENTS 5,145,457 A * 9/1992 Tanigaito ................. B60H 1/28
296/192
2018/0251162 A1* 9/2018 Overgaard ............. B62D 25/24

* cited by examiner

*Primary Examiner* — D Glenn Dayoan
*Assistant Examiner* — Melissa Ann Bonifazi
(74) *Attorney, Agent, or Firm* — Quinn IP Law

(57) ABSTRACT

A plenum assembly for a vehicle includes a plenum body, a plenum grid coupled to the plenum body, the plenum grid including a grid surface having a plurality of grid openings and a separation member extending from the grid surface toward the plenum body, and a vent port including a side surface extending from the plenum body and a domed surface formed integrally with the side surface, the vent port including an edge defining a vent port opening in the side surface such that a flow of air passes through the vent port and through the plurality of grid openings in the grid surface.

20 Claims, 3 Drawing Sheets

WINDSHIELD PLENUM ASSEMBLY WITH INTEGRATED VENTILATION PORT

The present disclosure relates generally to an integrated vent port design for a windshield plenum assembly to improve engine compartment air circulation and prevent water intrusion.

Under hood components such as engines and engine exhaust systems create high temperature conditions at the rear end of the engine compartment near the vehicle windshield. Tight packaging constraints within the engine compartment result in poor engine compartment air circulation and air stagnation.

SUMMARY

Embodiments according to the present disclosure provide a number of advantages. For example, embodiments according to the present disclosure enable improved air circulation within the engine compartment and prevention of water intrusion into the engine compartment with ventilation ports integrated into an existing windshield plenum.

In one aspect of the present disclosure, a plenum assembly for a vehicle includes a plenum body, a plenum grid coupled to the plenum body, the plenum grid including a grid surface having a plurality of grid openings and a separation member extending from the grid surface toward the plenum body, and a vent port including a side surface extending from the plenum body and a domed surface formed integrally with the side surface, the vent port including an edge defining a vent port opening in the side surface such that a flow of air passes through the vent port and through the plurality of grid openings in the grid surface.

In some aspects, the plenum assembly further includes a sealing member positioned between the separation member and the plenum body establishing a first chamber separated from a second chamber.

In some aspects, the vent port is positioned in the second chamber such that a flow of ambient air passing through the plenum grid is separated from a flow of heated air passing through the plenum grid.

In some aspects, the separation member is separated from the plenum body to form a liquid discharge port.

In some aspects, the liquid discharge port is positioned on an opposite side of the separation member from the sealing member such that a flow of liquid through the plurality of grid openings in the plenum grid is directed away from a flow of ambient air and a flow of heated air passing through the plenum grid.

In some aspects, the separation member is a circular member encircling the vent port.

In some aspects, the vent port is integrally formed with the plenum body.

In some aspects, the vent port is positioned beneath the plenum grid such that the plenum body and the vent port are covered by the plenum grid.

In some aspects, the separation member is cylindrical and is configured to interface with the plenum body via a sealing member at a first side of the separation member and be separated from the plenum body at a second side of the separation member.

In another aspect of the present disclosure, an automotive vehicle includes a vehicle body enclosing an engine compartment including a propulsion system and a passenger compartment, a windshield coupled to the vehicle body, and a plenum assembly positioned between the windshield and the engine compartment. The plenum assembly includes a plenum body, a plenum grid coupled to the plenum body, the plenum grid including a grid surface having a plurality of grid openings and a separation member extending from the grid surface toward the plenum body, and a vent port including a side surface extending from the plenum body and a domed surface formed integrally with the side surface. The vent port permits a release of heated air from the engine compartment separate from a flow of air from the environment to the passenger compartment.

In some aspects, the plenum assembly further includes a sealing member positioned between the separation member and the plenum body establishing a first chamber separated from a second chamber.

In some aspects, the vent port is positioned in the second chamber such that a flow of ambient air passing through the plenum grid is separated from a flow of heated air passing through the plenum grid.

In some aspects, the separation member is separated from the plenum body to form a liquid discharge port.

In some aspects, the liquid discharge port is positioned on an opposite side of the separation member from the sealing member such that a flow of liquid through the plurality of grid openings in the plenum grid is directed away from a flow of ambient air and a flow of heated air passing through the plenum grid.

In some aspects, the separation member is a circular member encircling the vent port.

In some aspects, the vent port is integrally formed with the plenum body.

In some aspects, the vent port is positioned beneath the plenum grid such that the plenum body and the vent port are covered by the plenum grid.

In some aspects, the propulsion system includes an engine and during engine operation, a flow of ambient air enters the engine compartment via the vent port and when engine operation ceases, a flow of heated air is evacuated from the engine compartment via the vent port.

In another aspect of the present disclosure, a plenum assembly for a vehicle, includes a plenum body and a plenum grid coupled to the plenum body. The plenum grid includes a grid surface having a plurality of grid openings and a separation member extending from the grid surface toward the plenum body. The plenum body includes a circular vent port integrally formed with the plenum body and including a dome formed from a side surface extending from the plenum body and a domed surface formed integrally with the side surface. The vent port includes a plurality of edges defining a plurality of vent port openings in the side surface such that a flow of air passes through the vent port and through the plurality of grid openings in the grid surface. The separation member surrounds the vent port such that a flow of heated air passes through the vent port and is separated from a flow of ambient air passing through the plenum grid.

In some aspects, the plenum body includes a lower surface configured to direct a flow of fluid away from an engine compartment of the vehicle and the plenum body interfaces with the separation member to define a chamber configured to route a flow of ambient air to a passenger compartment of the vehicle.

BRIEF DESCRIPTION OF THE DRAWINGS

The present disclosure will be described in conjunction with the following figures, wherein like numerals denote like elements.

Figure 2:
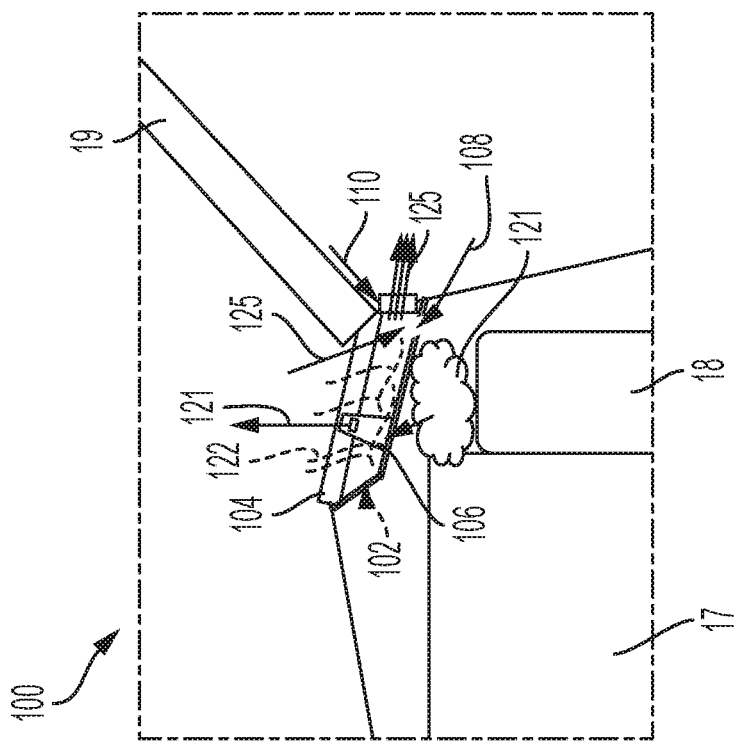
FIG. 2 is a close-up schematic side sectional view of the plenum assembly of FIG. 1, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
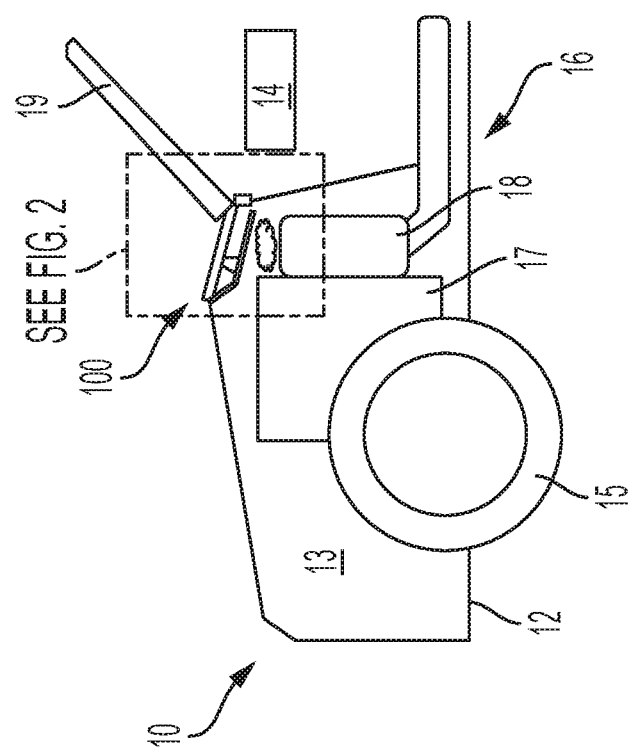
FIG. 1 is a schematic partial side sectional view of a vehicle including a plenum assembly with an integrated vent port, according to an embodiment.

FIG. 1 is a schematic illustration of a portion of a vehicle 10 including a plenum integrated vent port as part of a plenum assembly 100, according to an embodiment. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 generally includes a body 12 and wheels 15 (one shown). The body 12 encloses the other components of the vehicle 10. The body 12 defines an engine compartment 13 and also defines a passenger compartment or cabin 14. The wheels 15 are each rotationally coupled to the body 12 near a respective corner of the vehicle 10.

The engine compartment 13 of the body 12 encloses a propulsion system 16 which in various embodiments includes an internal combustion engine 17 and a catalytic converter 18. In various embodiments, the propulsion system 16 includes an electric machine such as a traction motor, and/or a fuel cell propulsion system. The propulsion system 16 is positioned within the engine compartment 13. The engine compartment 13 is enclosed by the body 12 and forms a confined area that contains the heat generated by the components of the propulsion system 16. In various embodiments, the confined heat is located close to a windshield 19 and passenger compartment 14, at the rear of the engine compartment 13. The heated air generated by the components of the propulsion system 16 can cause reductions in the efficiency of performance of the propulsion system 16 if not vented to the atmosphere. Furthermore, it is desirable to redirect the heated air away from the passenger compartment 14.

The windshield 19 is coupled to the body 12. Between the windshield 19 and the body 12 enclosing the engine compartment 13 is the plenum assembly 100. The plenum assembly 100, shown in closer detail in FIG. 2, is positioned between the windshield 19 and the body 12 to allow a flow of air between the engine compartment 13 and the environment and the passenger compartment 14 and the environment, as well as direct a flow of liquid, such as water, away from the engine compartment 13.

The plenum assembly 100 includes a plenum body 102 coupled with a plenum grid 104. The plenum grid 104 includes a plurality of grid openings to allow heated air 121 from the engine compartment 13 to escape to the surrounding environment, recirculate fresh air between the surrounding environment and the engine compartment 13 and passenger compartment 14, and permit water flow 122 to pass through the plenum grid 104 and drain away from the propulsion system 16.

In various embodiments, the plenum assembly 100 includes a vent port 106 and a water discharge port or opening 108. In various embodiments, the plenum assembly 100 also includes a cabin air inlet port 110. The vent port 106 allows heated air 121 from the engine compartment 13 to escape to the environment without interfering with fresh air ingress 125 to the engine compartment 13 (shown in FIG. 3). The vent port 106 also allows the heated air 121 to escape from the engine compartment 13 without interfering with the flow of water ingress 128 through the plenum grid 104 and through the water discharge port 108. The cabin air inlet port 110 permits the ingress of fresh air from the environment to the passenger compartment 14.

Figure 3:
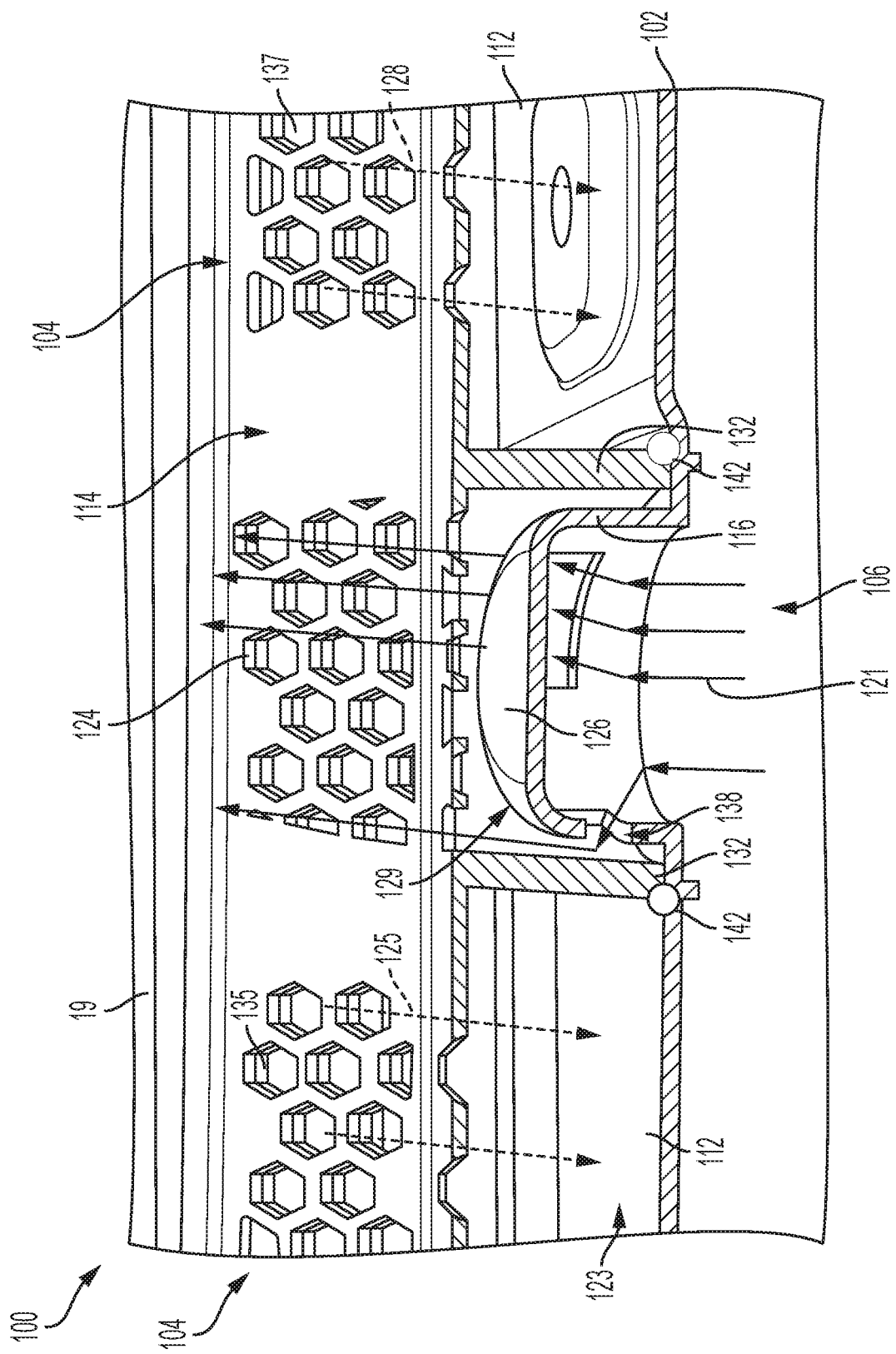
FIG. 3 is a partial schematic sectional view of the plenum assembly looking toward a vehicle windshield, according to an embodiment.
Figure 4:
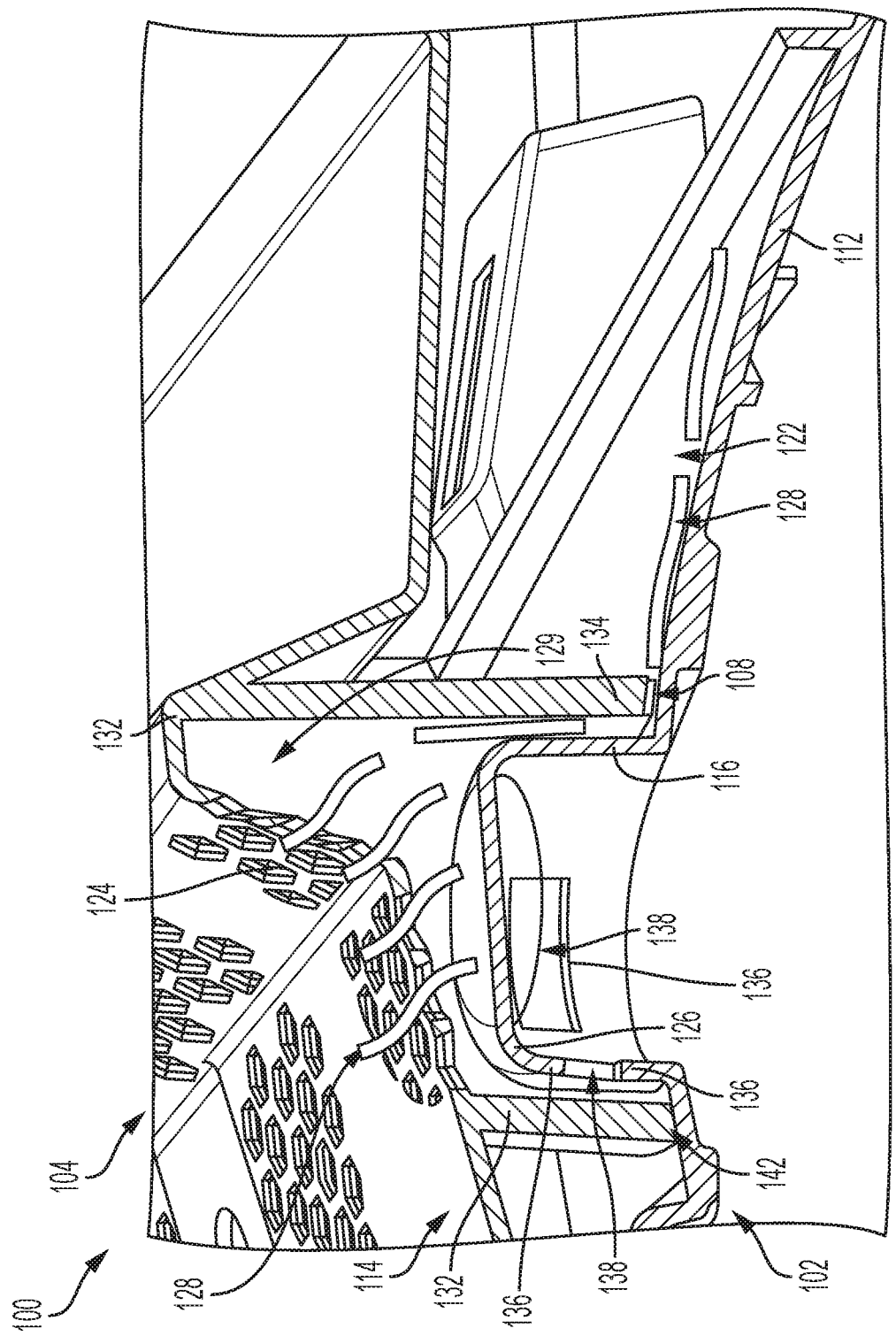
FIG. 4 is a partial side schematic sectional view of the plenum assembly, according to an embodiment.

FIGS. 3 and 4 illustrate the plenum assembly 100 in greater detail. FIG. 3 illustrates a cross-section of the plenum assembly 100 looking toward the windshield 19. FIG. 4 illustrates a side view cross-section of the plenum assembly 100. The plenum body 102 includes the vent port 106 that is, in various embodiments, a dome-shaped port integrally formed with and extending from the plenum body 102. The plenum body 102 includes a plurality of surfaces, such as a lower surface 112, that act as surfaces to catch and direct water flow 128 away from the engine compartment 13 (that is, to the right as shown in FIG. 4). The interface between the lower surface 112 and a separation member 132, discussed herein, also defines a chamber 123 configured to route a flow of air 125 from the environment to the passenger compartment 14. Fresh air and water are both allowed to enter the chamber 123 via the openings in the plenum grid 104, as discussed herein. Water or other fluid is routed away from the engine compartment 13 while fresh air from the environment is allowed to circulate into the engine compartment 13 and the passenger compartment 14.

The plenum body 102 interfaces with the plenum grid 104. The plenum grid 104 includes a plenum grid surface 114 that includes a plurality of openings. In various embodiments, the openings are aligned with the various chambers of the plenum assembly 100. A plurality of openings 124 permit the flow of heated air 121 from the engine compartment 13 to the environment. A plurality of openings 135, 137 permit air recirculation between the environment and the engine compartment 13 and the passenger compartment 14 and also permit water ingress 128 that is then directed by the surfaces of the plenum body 102 to the water discharge port 108.

The plenum grid 104 includes a circular separation member 132 as best shown in FIG. 4. The separation member 132 extends from the plenum grid surface 114 toward the lower surface 112 of the plenum body 102. A terminal end 134 of the separation member 132 positioned toward the rear of the plenum assembly 100 is separated from the lower surface 112 of the plenum body 102 to define the water discharge port 108 through which water or liquid ingress 128 is directed. A sealing member 142 seals the interface between the separation member 132 and the lower surface 112. The sealing member 142 separates the flow of fresh air 125 from the environment from the flow of heated air 121 ventilated from the engine compartment 13. The sealing member 142 restricts the flow of heated air 121 from entering the passenger compartment 14.

In various embodiments, the vent port 106 includes a side surface 116 and a ceiling surface 126 formed integrally with the side surface 116. The side surface 116 and the ceiling surface 126 form a circular, domed vent port 106 within the plenum assembly 100 below the plenum grid 104. In various embodiments, the vent port 106 is integrally formed with the plenum body 102 in a molding process, or other manufacture process.

In various embodiments, the vent port 106 includes at least one edge 136 formed in the side surface 116. The edge 136 defines an opening 138 in the side surface 116. FIGS. 3 and 4 illustrate two openings 138 with one of the openings 138 shown as a rectangular opening in the side surface 116 and another opening 138 shown as part of the cutaway section. Heated air 121 rises from the engine compartment 13 into the vent port 106 and flows through the openings 138 into a plenum space 129 defined between the plenum grid 104 and an exterior surface of the vent port 106. The heated air 121 then escapes to the environment by passing through the openings 124 in the plenum grid 104.

As shown, the vent port 106 is separated from the plenum grid 104 to define the plenum space 129. Heated air does not flow directly upward through the vent port 106 but is rather routed to escape the vent port 106 through the side-oriented openings 138. The orientation of the openings 138 on the side of the vent port 106 permit air recirculation through the vent port 106 while also preventing water intrusion into the engine compartment 13 through the vent port 106. Water or other fluid that enters the plenum space 129 via the openings 124 is routed rearward and through the water discharge port 108. The sealing member 142, in addition to preventing heated air to mix with the fresh air flow to the engine compartment 13 and the passenger compartment 14, also prevents an undesired ingress of water or other fluid into the engine compartment 13.

The plenum assembly 100 illustrated in FIGS. 1-4 improves air circulation within the engine compartment while also avoiding water intrusion into the engine compartment. Furthermore, the vent port 106 is hidden from view beneath the plenum grid 104 such that vehicle aesthetics are not affected.

During operation of the propulsion system 16, including, in various embodiments, the engine 17, the plenum assembly 100 permits an influx of air into the engine compartment 13 via the vent port 106, along with the air recirculation occurring through the openings 135, 137. When the engine 17 ceases operation during an engine stop, the heated air is evacuated through the vent port 106 as described herein, while allowing fresh air recirculation into the engine compartment 13 and passenger compartment 14 via the openings 135, 137. The vent port 106 therefore operates as both an air influx port and an air evacuation port, depending on engine operating conditions.

In various embodiments, the plenum assembly 100, including the plenum body 102 and the plenum grid 104, are formed from a rigid plastic in a molding or other plastic manufacturing process. In various embodiments, the plenum body 102 is configured to engage with an existing plenum grid 104 to allow the air recirculation and fluid routing as described herein.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A plenum assembly for a vehicle, comprising:
a plenum body;
a plenum grid coupled to the plenum body, the plenum grid including a grid surface having a plurality of grid openings and a separation member extending from the grid surface toward the plenum body; and
a vent port including a side surface extending from the plenum body and a domed surface formed integrally with the side surface, the vent port including an edge defining a vent port opening in the side surface such that a flow of air passes through the vent port and through the plurality of grid openings in the grid surface.

2. The plenum assembly of claim 1 further comprising a sealing member positioned between the separation member and the plenum body establishing a first chamber separated from a second chamber.

3. The plenum assembly of claim 2, wherein the vent port is positioned in the second chamber such that a flow of ambient air passing through the plenum grid is separated from a flow of heated air passing through the plenum grid.

4. The plenum assembly of claim 2, wherein the separation member is separated from the plenum body to form a liquid discharge port.

5. The plenum assembly of claim 4, wherein the liquid discharge port is positioned on an opposite side of the separation member from the sealing member such that a flow of liquid through the plurality of grid openings in the plenum grid is directed away from a flow of ambient air and a flow of heated air passing through the plenum grid.

6. The plenum assembly of claim 1, wherein the separation member is a circular member encircling the vent port.

7. The plenum assembly of claim 1, wherein the vent port is integrally formed with the plenum body.

8. The plenum assembly of claim 1, wherein the vent port is positioned beneath the plenum grid such that the plenum body and the vent port are covered by the plenum grid.

9. The plenum assembly of claim 1, wherein the separation member is cylindrical and is configured to interface with the plenum body via a sealing member at a first side of the separation member and be separated from the plenum body at a second side of the separation member.

10. An automotive vehicle, comprising:
a vehicle body enclosing an engine compartment including a propulsion system and a passenger compartment;
a windshield coupled to the vehicle body; and
a plenum assembly positioned between the windshield and the engine compartment, the plenum assembly comprising:
a plenum body;
a plenum grid coupled to the plenum body, the plenum grid including a grid surface having a plurality of grid openings and a separation member extending from the grid surface toward the plenum body; and
a vent port comprising a side surface extending from the plenum body and a domed surface formed integrally with the side surface;
wherein the vent port permits a release of heated air from the engine compartment separate from a flow of air from an ambient environment to the passenger compartment.

11. The automotive vehicle of claim 10, wherein the plenum assembly further comprises a sealing member positioned between the separation member and the plenum body establishing a first chamber separated from a second chamber.

12. The automotive vehicle of claim 11, wherein the vent port is positioned in the second chamber such that a flow of ambient air passing through the plenum grid is separated from a flow of heated air passing through the plenum grid.

13. The automotive vehicle of claim 11, wherein the separation member is separated from the plenum body to form a liquid discharge port.

14. The automotive vehicle of claim 13, wherein the liquid discharge port is positioned on an opposite side of the separation member from the sealing member such that a flow of liquid through the plurality of grid openings in the plenum grid is directed away from a flow of ambient air and a flow of heated air passing through the plenum grid.

15. The automotive vehicle of claim 10, wherein the separation member is a circular member encircling the vent port.

16. The automotive vehicle of claim 10, wherein the vent port is integrally formed with the plenum body.

17. The automotive vehicle of claim 10, wherein the vent port is positioned beneath the plenum grid such that the plenum body and the vent port and covered by the plenum grid.

18. The automotive vehicle of claim 10, wherein the propulsion system includes an engine and during engine operation, a flow of ambient air enters the engine compartment via the vent port and when engine operation ceases, a flow of heated air is evacuated from the engine compartment via the vent port.

19. A plenum assembly for a vehicle, comprising:
a plenum body and a plenum grid coupled to the plenum body, the plenum grid including a grid surface having a plurality of grid openings and a separation member extending from the grid surface toward the plenum body, the plenum body including a circular vent port integrally formed with the plenum body and including a dome formed from a side surface extending from the plenum body and a domed surface formed integrally with the side surface, the vent port including a plurality of edges defining a plurality of vent port openings in the side surface such that a flow of air passes through the vent port and through the plurality of grid openings in the grid surface;

wherein the separation member surrounds the vent port such that a flow of heated air passes through the vent port and is separated from a flow of ambient air passing through the plenum grid.

20. The plenum assembly of claim 19, wherein the plenum body includes a lower surface configured to direct a flow of fluid away from an engine compartment of the vehicle and the plenum body interfaces with the separation member to define a chamber configured to route a flow of ambient air to a passenger compartment of the vehicle.

\* \* \* \* \*